March 4, 1969     D. L. P. HAMILTON     3,431,349
CABLE TERMINAL ENCLOSURE WITH GROUNDING CROSS BAR
Filed Dec. 28, 1967
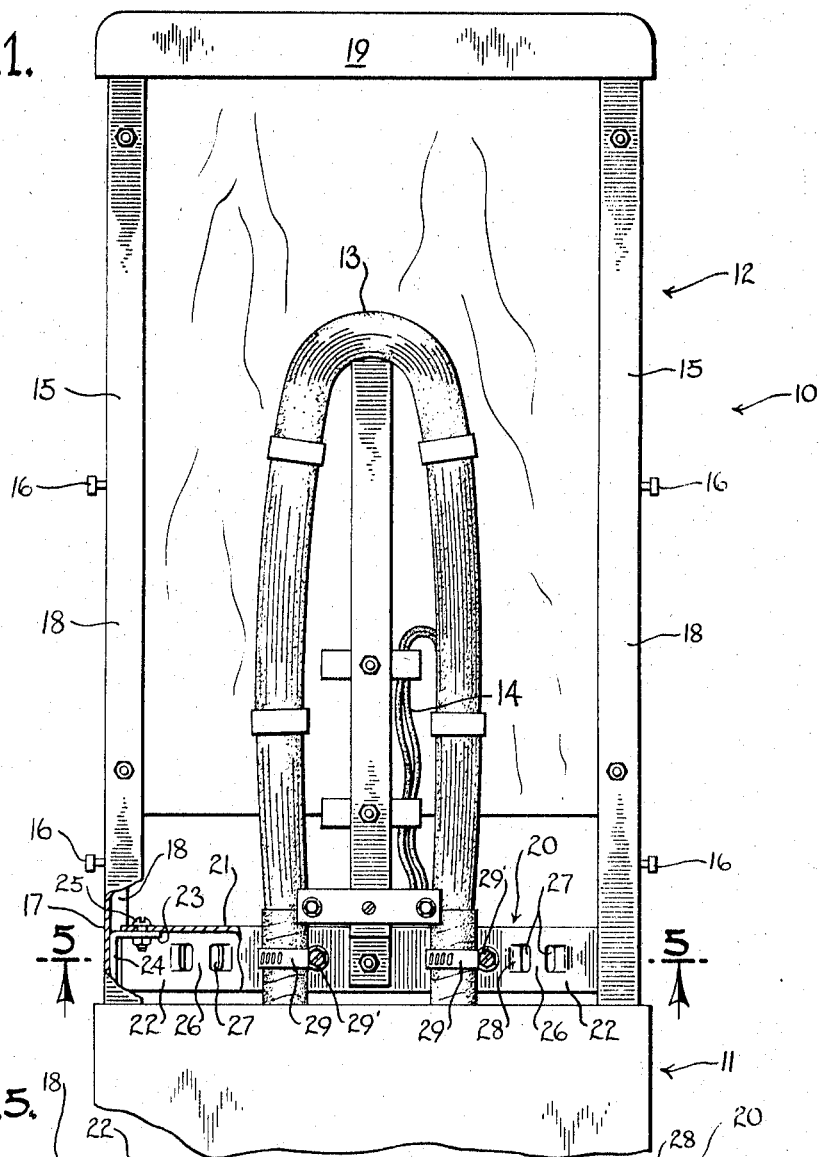
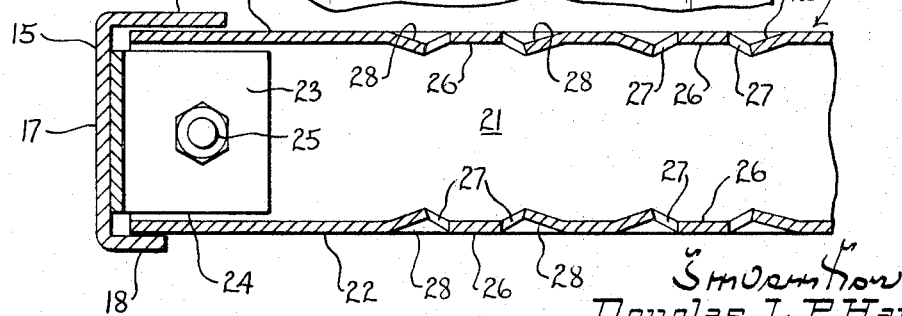
Douglas L. P. Hamilton

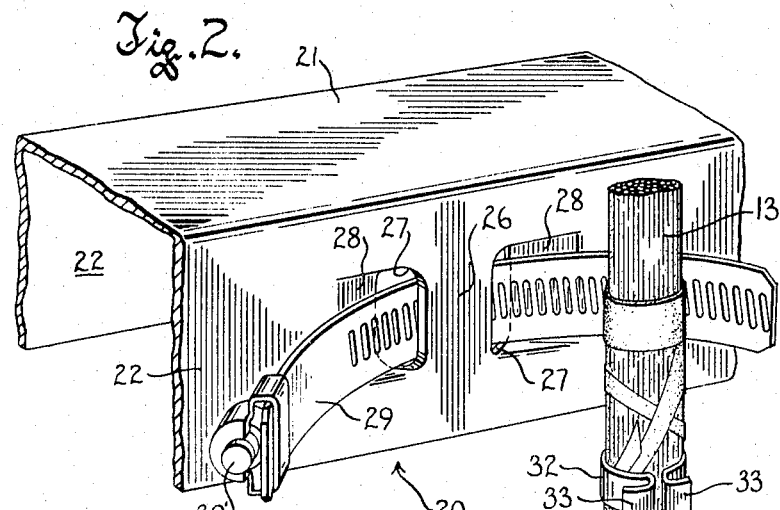
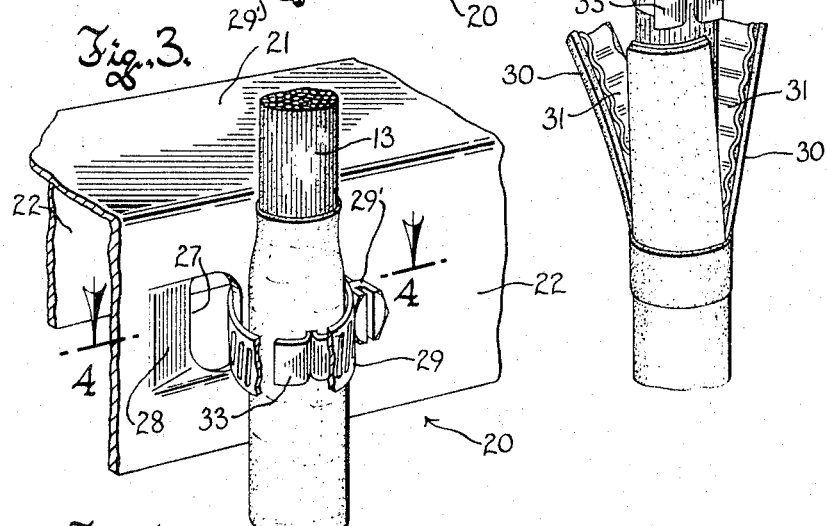
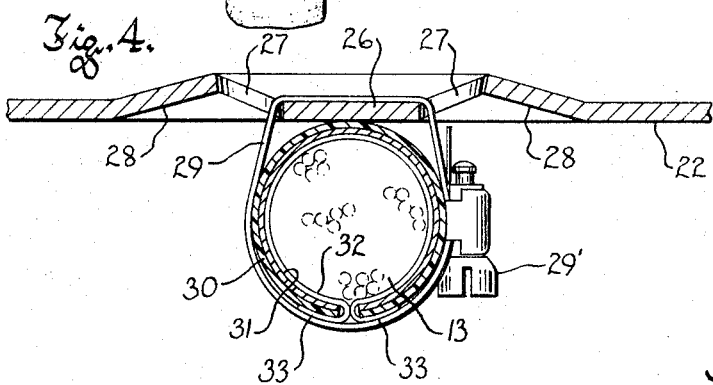

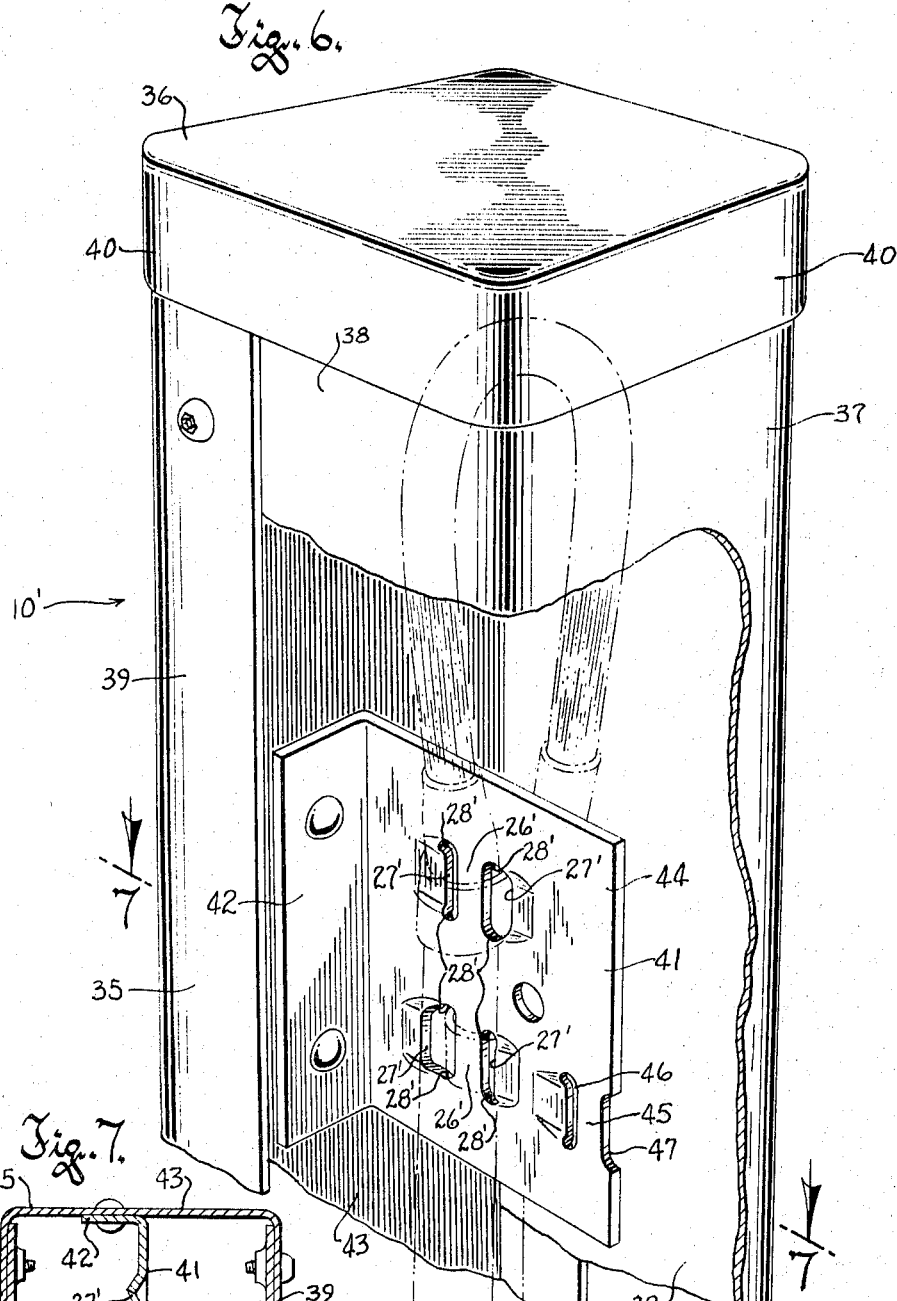
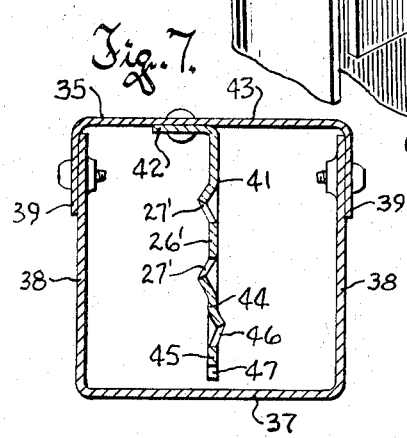

United States Patent Office 3,431,349
Patented Mar. 4, 1969

3,431,349
CABLE TERMINAL ENCLOSURE WITH
GROUNDING CROSS BAR
Douglas L. P. Hamilton, c/o Utility Products Co.,
3111 W. Mill Road, Milwaukee, Wis. 53209
Continuation-in-part of application Ser. No. 607,256,
Jan. 4, 1967. This application Dec. 28, 1967, Ser.
No. 694,265
U.S. Cl. 174—38   8 Claims
Int. Cl. H02g 9/00

ABSTRACT OF THE DISCLOSURE

Portions of the opposite stretches of an above-ground loop of buried utility cable are clamped to necks forming an integral part of a metal cable support and grounding member secured to a grounded portion of the enclosure housing the loop. In one embodiment, this cable support and grounding member is a channel-shaped crossbar spanning opposite walls of the enclosure; in the other, it is an angle-shaped stamping secured to one wall of the enclosure.

---

This invention, like that of the now abandoned application Ser. No. 607,256, filed Jan. 4, 1967, of which this application is a continuation-in-part, relates to cable enclosures in which the above-ground loops of buried telephone cables and the ends of service leads connected thereto are protectively housed, and has more particular reference to improvements in the means for anchoring such loops in place in their enclosures.

The outer insulating sheath and the metallic inner grounding shield are customarily stripped from the upper stretches of a cable loop to enable service connections to be made to pairs of conductors of which the cable is comprised. So-called butts are formed at the locations where the loop enters the enclosure, and in the past these butts were anchored to the stems of substantially T-headed metal tabs that were riveted to parts of the rigid frame structure inside the cable enclosure. Screw tightenable hose clamps were provided for that purpose, each embracing the stem of one of the tabs and the cable butt laid thereagainst with an electrical grounding ribbon on the butt in contact with the stem to ground the metallic shield thereto. Hence, the cable loop received physical support from the tabs, and the ends of the metallic grounding shield beneath the insulated outer covering at the butts were effectively electrically connected by the tabs and the frame structure to which they were riveted.

While this past practice afforded the desired electrical continuity between the severed ends of the metallic shield as well as good support for the cable loop, the presence of the tabs to which the cable butts were clamped was objectionable. These tabs constituted a hazard to linemen installing the cable enclosures or connecting service leads to conductors in the loops, in that their fingers or hands were sometimes seriously lacerated by contact with sharp corner and edge portions of the tabs.

In addition, there was the further objection that the expense of producing separate tabs and of riveting them to the framework of the enclosure contributed significantly to the production costs of such cable enclosures.

With these objections in mind, it is the purpose of this invention to provide a cable enclosure such as described with a rigid cable-supporting member which may be a crossbar, to which the opposite stretches or butts of a cable loop can be directly clamped so as to eliminate both the danger heretofore presented by the separate clamping tabs as well as the expense of producing and riveting them to the supporting structure of the enclosure.

More specifically, it is the purpose of this invention to provide a cable-supporting crossbar for terminal enclosures, having spaced necks formed thereon and along which the butts of a cable loop can be laid and firmly anchored by cable clamps each having one end threaded through spaced apertures in the bar that define the neck to which the clamp is secured.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate two complete examples of the physical embodiments of the invention constructed according to the best modes so far devised for the practical application of the principles thereof, and in which:

FIGURE 1 is an elevational view of a cable enclosure equipped with the crossbar version of this invention, the covers of the enclosure being removed to illustrate how the butts on the stretches of the cable loop inside the enclosure are clamped to the crossbar;

FIGURE 2 is an enlarged fragmentary perspective view illustrating how the cable is prepared for securement to the crossbar and showing a clamp in position on the latter but before closure of the clamp;

FIGURE 3 is an enlarged fragmentary perspective view of a portion of the crossbar to which a stretch of the cable loop is clamped, a portion of the clamp being broken away;

FIGURE 4 is a sectional view taken through FIGURE 3 on the line 4—4 thereof;

FIGURE 5 is a cross sectional view taken on the line 5—5 in FIGURE 1;

FIGURE 6 is a perspective view of the upper portion of a cable enclosure of somewhat different design and construction from the enclosure illustrated in FIGURE 1, and illustrating a modified form of supporting member embodying this invention; and FIGURE 7 is a cross sectional view through FIGURE 6 on the plane of the line 7—7.

Referring now more particularly to the accompanying drawings, and especially to FIGURES 1–5 thereof, the number 10 designates a cable enclosure generally on the order of that disclosed in my Patent No. 3,257,496, issued June 21, 1966. Similarly, the enclosure comprises a lower housing section 11 of generally rectangular cross sectional shape, and which serves as an anchor post that may be set into the ground alongside an underground cable so that a loop of an underground cable, or a plurality of such loops, can be run up into it from its bottom. The enclosure also comprises an upper housing section 12 into which the upper portion 13 of the cable loop or loops extend for connection with service leads such as indicated at 14. So that access may be had to the upper portion of the cable loop 13, the upper housing section is comprised of side walls (not shown) which serve as covers that are readily detachably secured to a pair of rigid upright frame members 15 by screws 16 threaded into the frame members.

The frame members 15 are disposed at opposite sides of the upper housing section 12, substantially midway between its front and back. As seen in FIGURE 5, the frame members 15 are channel shaped in cross section, having their webs 17 secured flatwise to the sides of the lower housing section at its interior, and having flanges 18 which project inwardly of the upper housing section. A top 19 for the upper housing section is secured to the tops of the frame members 15 in any suitable manner.

The cable supporting member, in this form of the invention, is a crossbar 20 which extends horizontally across the interior of the upper housing section 12 between the frame members 15 thereof, at a location slightly above the upper end of the lower housing section 11. This crossbar is a channel-shaped metal stamping which is disposed with its web 21 uppermost and its opposite flanges 22 depending therefrom. The opposite ends of the crossbar extend into the open sides of the channel-shaped frame members 15, where its web 21 seats upon the inwardly projecting legs 23 of clip angles 24 welded or otherwise affixed to the webs 17 of the frame members, to be secured to the clip angles by bolts 25. The flanges 22 of the crossbar straddle the flanges 23 of the clip angles, as seen best in FIGURE 5. The crossbar, of course, is thus effectively grounded to the lower post section 11, through the frame members 15 of the upper housing section.

At zones spaced lengthwise along the crossbar, each of its flanges 22 is provided with a number of upright cable supporting necks 26 that lie in the planes of their respective flanges and comprise integral parts thereof. Each of these necks is defined by a pair of spaced apart vertically elongated apertures 27 in its flange, opposite a pair of such neck defining apertures in the opposite flange. The apertures 27 of each pair of thereof provide for threading one free end portion of a tightenable hose clamp 29 therethrough, behind the neck defined by said apertures, so that the neck and a stretch of the cable loop 13 laid thereagainst can be embraced by the hose clamp when its ends are connected at the outer side of the crossbar. The cable is securely anchored to the neck in the manner seen best in FIGURE 4 after the screw 29' of the hose clamp is tightened.

The portions of the flanges 22 adjacent to the remote edges of the apertures 27 of each pair thereof are indented inwardly, as at 28, to facilitate threading the free ends of the clamps through the apertures.

FIGURE 1 illustrates a condition where a cable loop is disposed in front of the near flange 22 of the crossbar 20 to have both of its stretches anchored by clamps 29 to necks 26 which are remote from the ends of the crossbar. It will be understood however, that the stretches of the cable loop can, if desired, be anchored to any pair of necks on the same side of the crossbar, or to necks on opposite sides of the crossbar in cases where the cable is spliced in the upper housing section 12. In cases where the upper housing section serves to enclose a pair of cable loops, the loops can be arranged at opposite sides of the crossbar 20 to have their opposite stretches anchored to necks 26 on the adjacent flange of the crossbar.

FIGURES 2 and 3 illustrate how the loop of a telephone cable is prepared for connection of service leads to conductors of which the cable is comprised, and for anchoring the crossbar 20. The outer insulating sheath 30 and the metallic inner grounding shield 31 are stripped from all except small portions of the opposite stretches of the loop at the zone where it enters the bottom of the upper housing section 12, adjacent to the crossbar 20, so as to expose the bundle of insulated conductors of which the cable is comprised. Three longitudinal slits are then cut through the severed ends of both the outer sheath and the metallic inner shield as shown in FIGURE 2. This allows a metal grounding ribbon 32 to be wrapped around a bared portion of each stretch of the loop and slipped down under the flaps defined by the slits with the end portions 33 of the ribbon extending through one of the slits. The flaps are then folded in upon the ribbon and taped in place on the cable to securely hold the inner metal grounding shield against the ribbon, but with the end portions 33 of the grounding ribbon being left exposed. These end portions are then bent back over the taped down flaps, as seen best in FIGURES 3 and 4, to complete the formation of the so-called butts on the cable stretches.

The cable loop is anchored to the crossbar 20 by clamping its butts to the necks 26 on the crossbar, with the hose clamps 29 encircling the butts at the areas thereof where the end portions 33 of the grounding ribbon are exposed at their exteriors. Hence, the grounding ribbons serve to electrically connect both cut ends of the metallic shield 31 of the cable to the crossbar through the hose clamps, and the crossbar, of course, establishes the necessary electrical continuity between the severed end of the shield.

In the embodiment of the invention illustrated in FIGURES 6 and 7, the enclosure 10' comprises a channel-shaped post 35 with a cap 36 fixed thereto and projecting laterally from the post, and a removable cover section 37. This cover section, like the post, is channel or U-shaped in cross section and is of a size to have its flanges 38 received between the flanges 39 of the post and detachably secured thereto in any suitable manner. As shown, the cap 36 has downwardly directed flanges 40 which embrace the upper ends of the cover section and the post.

The cable support 41 in this case, is in the form of an angle-shaped stamping having a narrow flange 42 which is riveted or otherwise secured to the web 43 of the post, and a wide flange 44 which, as best seen in FIGURE 7, substantially bisects the interior of the enclosure. Since the flanges 39 of the post are much narrower than the flanges 38 of the cover section, removal of the cover section will result in practically the entire cable support 41 being readily accessible. Accordingly, securement of cables thereto will be facilitated.

To enable the securement or anchoring of the two stretches or legs of a cable loop to opposite sides of the support 41, its flange 44 has a pair of necks 26' which, like the necks 26 on the crossbar of the other embodiment of the invention, are flanked by vertically elongated apertures 27'. The necks 26' are vertically spaced and aligned so that one leg of the cable loop may be anchored—in the described manner—to one of the necks, and the other loop anchored to the other neck. Because the legs of the cable loop are anchored to opposite sides of the flange 44, the remote edge portions 28' of the apertures 27' flanking one of the necks 26' project to one side of the flange 44, while those at the other neck project to the opposite side of the flange 44.

Preferably the flange 44 has a third neck 45 to which a cable or service lead may be anchored. This third neck is defined by a single aperture 46 and a notch 47 in the outer edge of the flange 44; and to facilitate threading a clamp through the aperture 46, the edge portion 47 thereof which is remote from the neck is bent out of the plane of the flange 44.

As in the case of the other embodiment of the invention, anchorage of the two stretches of a cable to the support 41 electrically connects the severed ends of its metal shield and also grounds the cable, since the support 41, like the crossbar, is fixed to a well grounded portion of the structure—namely, the post 35.

From the foregoing description, together with the accompanying drawings, it will be apparent to those skilled in the art that this invention greatly facilitates the task of anchoring the above-ground loops of buried cable to the enclosures housing the loops, and that it eliminates one of the hazards which linemen previously had to contend with when working inside such enclosures.

What is claimed as my invention is:

1. In a cable enclosure for protectively housing an above-ground loop of buried utility cable and the service connections leading therefrom, wherein the enclosure comprises a rigid upright metal member that in use is well grounded, the improvement which comprises:

A. a metal cable support fixed to said upright metal member and disposed transversely within the enclosure, said cable support having (1) upright neck portions which are spaced from one another and from the upright metal member and have surfaces against which portions of the opposite stretches of a cable loop can be laid, and (2) flanking and defining each neck, a pair of spaced apart apertures through which an end portion of a cable clamp can be threaded to dispose both end portions of the clamp at the side of the cable support at which the adjacent stretch of the cable loop is located, for interengagement with one another around the neck and the cable portion lying against said surface thereof, so that tightening of the clamp draws said cable portion firmly against the neck and anchors it to the bar.

2. The structure set forth in claim 1, wherein the cable enclosure has two transversely spaced upright metal members that in use are well grounded, and further characterized in that the cable support is an elongated crossbar which extends transversely between and is fixed at its ends to both of said upright members, and certain of the upright neck portions are spaced from one another lengthwise of said crossbar and have their said surfaces at the same side of the crossbar, so that both stretches of a cable loop may be anchored to the same side of the crossbar.

3. The structure set forth in claim 2, further characterized in that said elongated crossbar is a channel-shaped member having opposite spaced apart flanges, each of which has at least one upright neck portion flanked by a pair of spaced-apart apertures.

4. The cable support of claim 3, wherein portions of each of said flanges adjacent to the remote edges of each pair of apertures therein are indented towards the opposite one of said flanges.

5. The cable support of claim 4, wherein said flanges are provided with several of said pairs of apertures at substantially equispaced locations along the length of the bar, each pair of apertures defining one of said necks and having their remote edge portions indented toward the opposite one of said flanges.

6. The structure set forth in claim 1, wherein said cable support is a substantially flat plate-like member disposed in edgewise vertical orientation and wherein at least two of the neck portions are in vertically spaced alignment, so that a cable loop which straddles the cable support may have its opposite stretches clamped to opposite sides of the cable support with said stretches directly opposite one another.

7. In a cable enclosure of the type used to protectively house the above-ground loops of buried utility cable and the service connections leading therefrom, wherein the enclosure comprises spaced apart rigid upright frame members, the improvement which comprises:

A. a channel-shaped grounding crossbar extending transversely between and fixed to said frame members and having (1) a substantially horizontal web, (2) spaced apart opposite flanges extending perpendicularly from said web, and (3) at least one pair of spaced apart apertures in each flange, defining therebetween an upright neck having a surface at the outer side of its flange against which a portion of one stretch of a cable loop can be laid, and through which apertures of each pair thereof an end portion of a cable clamp can be threaded to dispose both end portions of the clamp at said outer side of the flange for interengagement with one another around the neck and the cable portion lying against said surface thereof, so that tightening of the clamp draws said cable portion firmly against the neck and anchors it to the crossbar.

8. The structure of claim 7, further characterized by the fact that the portion of the flanges defining the remote edges of each pair of apertures are indented inwardly to facilitate threading cable clamps through the apertures and around the neck therebetween.

References Cited

UNITED STATES PATENTS

| 2,387,951 | 10/1945 | Slater et al. | 248—68 |
| 2,880,263 | 3/1959 | Herrmann et al. | 174—60 |
| 2,916,539 | 12/1959 | Hamilton | 174—38 |
| 3,164,668 | 1/1965 | Skubal | 174—44 X |
| 3,268,651 | 8/1966 | Stevenson | 174—38 |
| 3,347,505 | 10/1967 | Menser | 248—68 |
| 3,111,977 | 11/1963 | Kruger | 174—40 |

FOREIGN PATENTS

| 997,405 | 9/1951 | France. |

OTHER REFERENCES

Thomas and Betts Co. Product News, T7–88, March 1961.

LARAMIE E. ASKIN, *Primary Examiner.*

U.S. Cl. X.R.

174—51, 60; 248—68